June 28, 1932.  C. L. DAUN ET AL  1,865,088

BEARING STRUCTURE

Filed Aug. 9, 1926

Inventors
C. L. Daun
and P. E. Keller
by W. H. Lieber
Attorney

Patented June 28, 1932

1,865,088

UNITED STATES PATENT OFFICE

CARL L. DAUN AND PAUL E. KELLER, OF MILWAUKEE, WISCONSIN, ASSIGNORS, BY MESNE ASSIGNMENTS, TO AMERICAN ELECTRIC MOTOR COMPANY, OF MILWAUKEE, WISCONSIN

BEARING STRUCTURE

Application filed August 9, 1926. Serial No. 127,984.

This invention relates in general to improvements in bearing structures, and relates more specifically to improved means for supporting and lubricating bearings of the anti-friction type.

Generally stated, an object of the present invention is to provide a bearing structure which is compact in construction and efficient in operation.

Some of the more important specific objects of the present invention are as follows:—

To provide improved means for insuring positive and automatic delivery of an abundance of oil to the rollable elements of anti-friction bearings of the ball or roller types.

To provide an improved mounting or support for any type of bearings, whereby the entire bearings may be quickly and conveniently assembled or dismantled.

To provide a simple bearing structure all parts of which are readily machinable and accessible, and which is absolutely dirt proof and oil tight.

To provide a ball bearing in which the ball races may be increased or diminished in number or replaced by double race bearings if desired, and which is adapted to operate effectively with shafts rotating in either direction.

To provide a bearing especially applicable to motors, wherein the end heads of the motor may be removed without disturbing the bearing.

A clear conception of several embodiments of the invention and of the operation of devices constructed in accordance therewith, may be had by referring to the drawing accompanying and forming a part of this specification in which like reference characters designate the same or similar parts in the various views.

Figure 1:
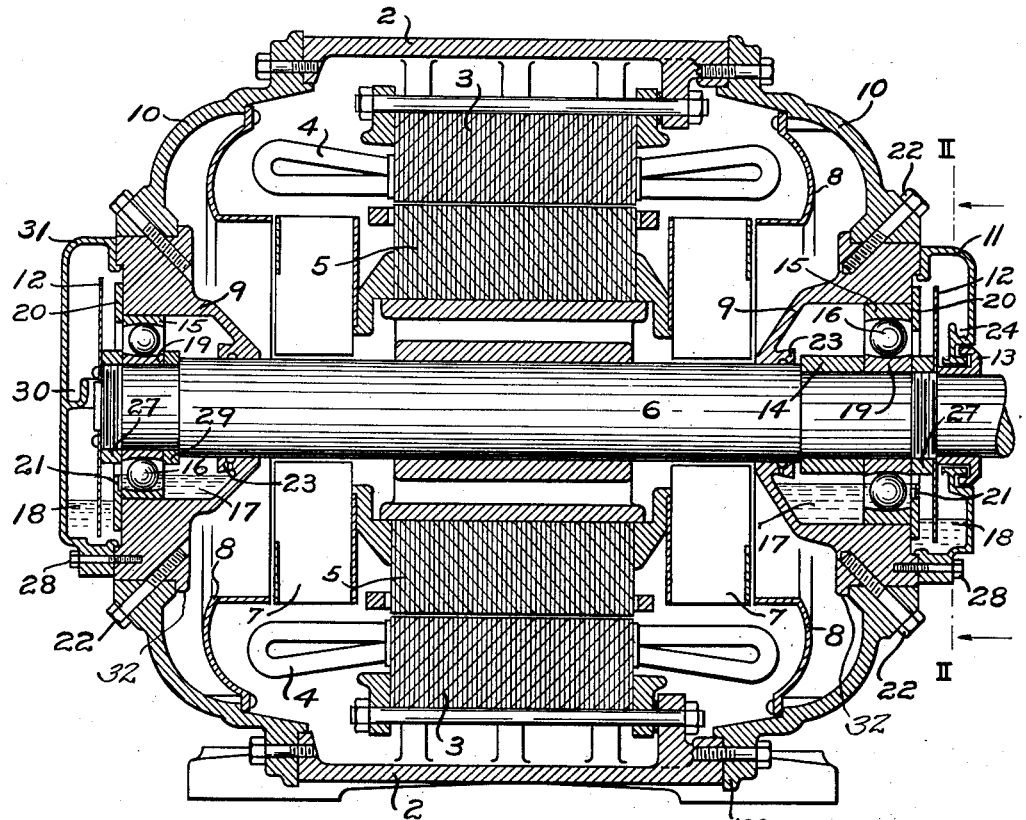
Fig. 1 is a central vertical section through an induction motor embodying front and rear ball bearing structures of improved construction.
Figure 3:
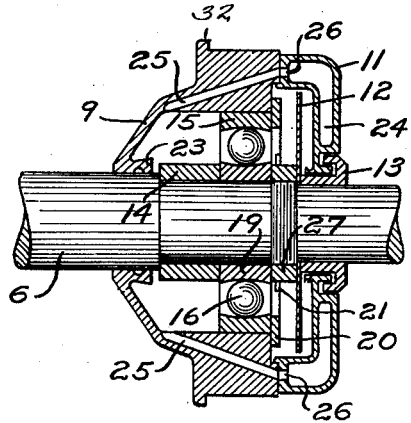
Fig. 3 is a central horizontal section through the improved front bearing of the induction motor.
Figure 2:
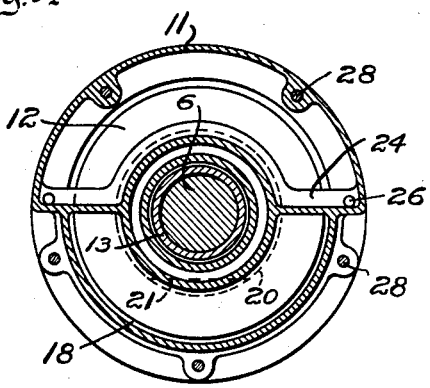
Fig. 2 is a transverse vertical section through the improved front bearing of the motor shown in Fig. 1, the section having been taken along the line II—II of Fig. 1 looking in the direction of the arrows.

The induction motor to which the invention has been applied by way of illustration, comprises in general a main frame 2; a stator consisting of a laminated core 3 and coils 4 mounted within the frame 2; a rotor consisting of a winding supporting core 5, ventilating fans 7 and a shaft 6 rotatably supported within the stator core 3; end heads 10 secured to the opposite ends of the frame 2 and cooperating therewith to provide a complete enclosure for the motor; and front and rear anti-friction bearing structures for the rotor shaft 6 detachably associated with the end heads 10. Secured within each of the end heads 10 is an annular curved wall 8, these walls cooperating with the fans 7 and with the coils 4 to form unobstructed ventilating passages around the stator coils.

The anti-friction front bearing structure comprises an inner ball race 19 secured to the shaft 6, an outer ball race 15 positioned in a bearing support 9, and an annular series of rollable elements or balls 16 cooperating with the ball races 15, 19. The bearing support 9 has an outer annular bearing surface to fit within a bore of the adjacent end head 10 and is detachably secured by means of inclined retaining screws 22, which draws the bearing support 9 into the end head 10 until the annular flange 32 on the bearing support engages an inner surface of the end head 10. The bearing support 9 is formed to provide an upper oil basin 17 through which the successive balls 16 travel as they roll along the races 15, 19. An annular plate 20 secured to the outer portion of the support 9, serves to retain the outer ball race 15 in place, and is provided with a transverse wall or dam 21 for retaining a proper level of oil within the basin 17. A cap 11 secured to the outer portion of the support 9 by means of cap screws 28, cooperates with the support 9 to form a lower oil basin 18 which receives the oil delivered from the upper basin 17. An oil thrower or disk 12 is detachably secured to the shaft 6 by means of a threaded supporting collar 27, and the periphery of the rotating disk 12 dips into the oil in the basin 18. A sealing element 13 secured to the shaft 6 adjacent to the disk 12 has an annular projection cooperating with an annular recess in the cover or cap 11 to prevent entry of dirt to the bearing. The cap 11 is provided with a transverse oil collecting recess or groove 24 which communicates with the upper basin 17 through holes 26 in the cap 11 and passages 25 in the support 9 registering with the holes 26. The support 9 is provided with an annular abutment 23 cooperable with a spacing sleeve or ring 14 located laterally adjacent to the inner ball race 19. The abutment 23 is bored to snugly fit the shaft 6 and has a peripheral recess cooperable with the rear inclined wall of the support 9 to prevent escape of oil along the shaft. Suitable oil supply and drainage openings for the basin 18 are also provided in the cap 11.

The anti-friction rear bearing is similar in construction to the front bearing previously described differing therefrom mainly in the specific formation of several of the elements. The end cover or cap 31 of the rear bearing is not penetrated by the shaft 6 and is therefore devoid of end openings. The oil collecting recess or groove 30 of the cap 31 extends directly across the outer wall of the cap and is not medially curved as is the groove 24. The spacing sleeve or ring 29 is also narrower than the ring 14 of the front bearing, because the rear bearing is not formed for the reception of more than one set or different types of bearings.

The operation of the front and rear bearings is identical, and the description of operation will therefore be confined to the front bearing. During normal operation of the motor, the rotor including the main shaft 6 is being rotated at a high rate of speed, carrying with it the oil thrower disk 12 which is secured to the shaft 6. As the revolving disk 12 cuts through the oil in the lower basin 18, it picks up some of this oil and throws it by centrifugal force against the upper wall of the cap 11. The oil thus delivered against the cap 11 flows by gravity into the collecting groove 24 from whence it flows through the holes 26 and the passages 25 into the upper basin 17. In the basin 17, the level of the oil is maintained above the lower portion of the ball race 15 by the dam 21, and the successive balls 16 of the bearing travel through and are thoroughly covered with oil from the basin 17 thus abundantly lubricating the bearing surfaces of the races 15, 19 and of the balls. The excess supply of oil overflowing from the basin 17 is delivered into the lower basin 18 from whence it is subsequently circulated by the disk 12 in the manner just described. During this circulation of the oil through the basins 17, 18, the labyrinth sealing afforded by the rotating element 13 cooperating with the cap 11, effectively prevents ingress of dirt to the bearing surfaces along the shaft 6, and the annular recess surrounding the abutment 23 and cooperating with the inclined rear wall of the support 9 likewise prevents inward escape of oil from the basin 17 toward the motor.

In order to dismantle the bearing structure, it is necessary to withdraw the oil from the basin 18 and to remove the end cap 11 by withdrawing the screws 28 and simultaneously sliding the cap 11 and element 13 along the shaft 6. After withdrawal of the cap 11, the disk supporting collar 27 may be unscrewed and likewise slid along the shaft 6 whereupon the plate 20 and dam 21 thereon are readily removable. Due to the fact that the collar 14 and the inner race 19 are snugly fitted upon the shaft 6, these elements may be driven from their normal assembled position by applying pressure against the peripheral abutment 23 of the support 9 after the end head 10 has been removed. By forcing the support 9 toward the right, the annular abutment 23 is caused to engage the spacing collar 14 and to force the collar and the ball race 19 along and from the shaft 6. Movement of the support 9 toward the right applies pressure only to the inner race 19 as the outer race 15 is slidable within the support. The structure may be assembled in an obvious manner by reversing the dismantling operations and the motor end head 10 may be removed completely to permit inspection of the motor interior, without disturbing the bearing structure, by merely removing the screws 22 and slipping the head 10 and wall 8 over the support 9 and the cover 11.

By removing the spacing collar 14, a second set of races and balls, or a bearing of the double race type or of different capacity, may be inserted within the support 9 thus permitting rapid change in the characteristics that is to say, if one of these motors has been used directly coupled to a machine, and it is desired to put a pulley on the shaft end for belt drive, whereby the strain on the drive end bearing is greater, then the bearing may be quickly changed to one of a larger capacity; furthermore it should be noted that the same bearing supports 9, may be used in motors of different horsepower, and the bearings themselves, chosen for the desired horsepower output. This arrangement thereby cheapens the total cost of producing various sizes of motors. In like manner, a sleeve or roller bearing may be substituted for the ball bearing. The plate 20 serves to retain the outer race 15 against displacement from within the support 9, and the collars 14, 29 likewise serve to prevent displacement of the race 19 inwardly along the shaft 6. The entire structure is obviously simple and compact in construction, effectively lubricated during operation, and may be conveniently assembled and dismantled.

The various elements of the structure are readily machinable in a lathe and with a drill press and the assembled structure is absolutely oil tight when operating with a normal oil supply. The circulation of the oil is automatically accomplished regardless of the direction of rotation of the shaft 6 and the structure is obviously applicable to various classes of machines other than motors.

The arrangement for removing the bearing by utilizing the annular abutment 23 is obviously adapted to facilitate removal of either ball, roller or sleeve bearings, without damaging the bearing elements.

It should be understood that it is not desired to limit the invention to the exact details of construction and operation herein shown and described for various modifications within the scope of the claims may occur to persons skilled in the art.

It is claimed and desired to secure by Letters Patent:—

1. In combination, a shaft, an element forming an oil basin below said shaft, a plurality of members positioned within said element and rollable in said basin and around said shaft, means comprising a removable cap and said element for forming a second basin for catching the overflow from said first mentioned basin; an oil thrower fastened to and turning with said shaft and extended into said second basin, and means consisting of a recess formed integrally with the cap for catching oil delivered by said thrower, said element having at least one passage leading from said recess in the cap to said first mentioned basin for returning the oil thereto.

2. In combination, a shaft, an element forming an oil basin below said shaft, a plurality of bearing members positioned within said element and rollable within said basin and around said shaft, a cap detachably secured to said element forming a second basin for catching the overflow from said first mentioned basin, means fastened to said shaft within said cap for elevating oil from said second basin, and means associated with said cap and element for conducting the elevated oil to said first mentioned basin and means for retaining a predetermined oil level in said first-mentioned basin.

3. In an electro-dynamic machine, a frame, a shaft, an end head carried by the frame and having a smooth bore therein, a bearing support having an outer annular bearing surface to fit said bore and a flange adjacent said annular bearing surface, means for holding the bearing support in said bore so said flange engages the end head, said bearing support having an internal initial bore to receive the outer one of anti-friction bearings of different capacities, and also having a circular abutment adjacent to the shaft to engage the inner race of said bearings, a spacer between the end of the said bearing support and the bearing to position the bearing in said initial bore when the bearing is of less width than the depth of the bore, said spacer also serving when used for applying pressure from said circular abutment to the inner race to assist in drawing the bearing from the shaft.

4. In an electro-dynamic machine, a frame, a shaft, an end head carried by the frame and having a smooth bore therein, a bearing support having an outer annular bearing surface to fit said bore, and an annular flange adjacent said annular bearing surface, said bearing support adapted to be mounted in said head so said flange engages an inner surface on the head; screw-threaded devices for holding the bearing support in the specified position in said bore, said bearing support having a relatively deep internal initial bore whereby anti-friction bearings of different capacities for said shaft may be mounted within said initial bore, as and for the purposes described.

In testimony whereof, the signatures of the inventors are affixed hereto.

CARL L. DAUN.
PAUL E. KELLER.